UNITED STATES PATENT OFFICE.

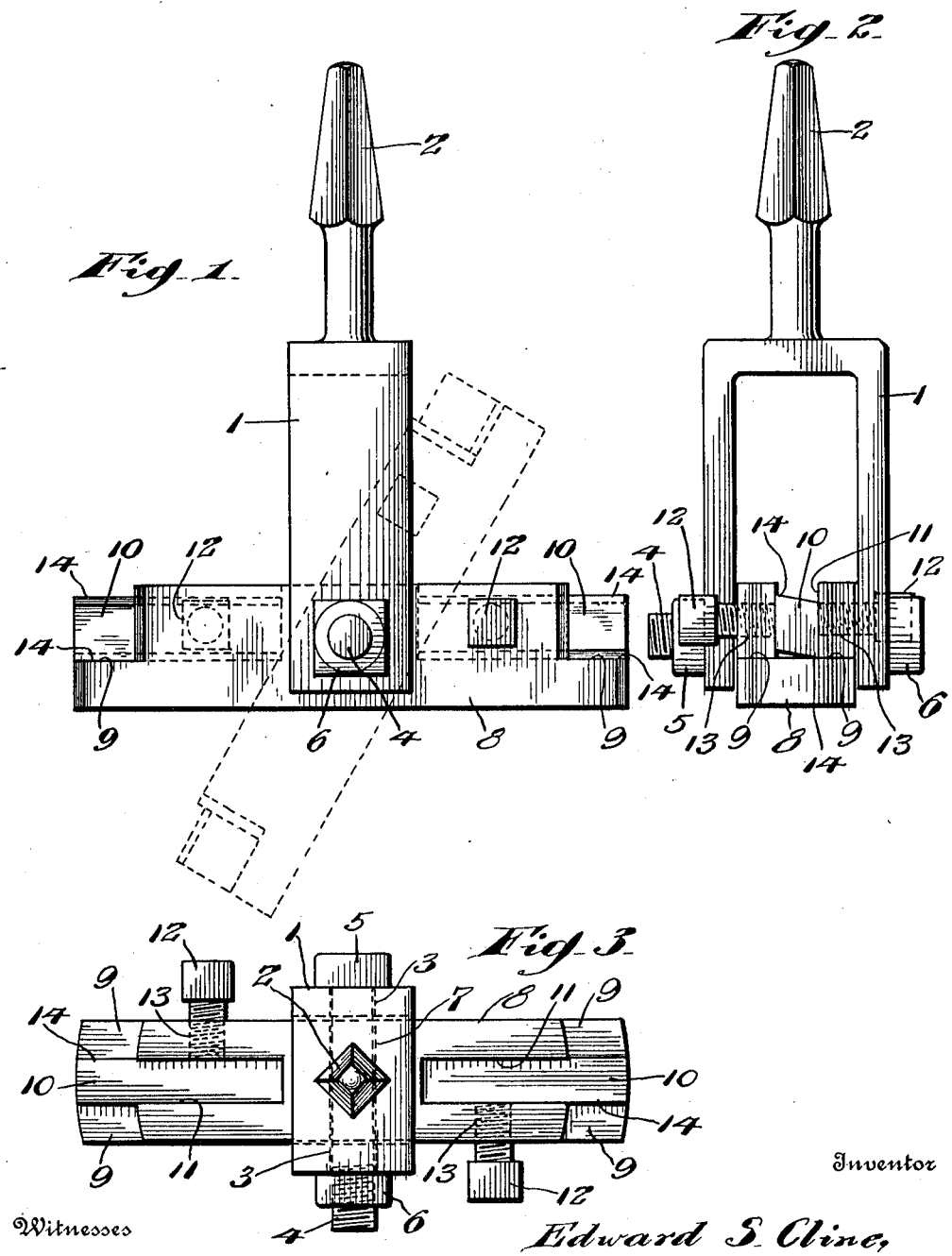

EDWARD S. CLINE, OF PHOENIXVILLE, PENNSYLVANIA.

BOILER-CLEANER.

1,022,063.  Specification of Letters Patent.  Patented Apr. 2, 1912.

Application filed January 25, 1912. Serial No. 673,353.

*To all whom it may concern:*

Be it known that I, EDWARD S. CLINE, a citizen of the United States, residing at Phoenixville, in the county of Chester and State of Pennsylvania, have invented certain new and useful Improvements in Boiler-Cleaners, of which the following is a specification.

My invention relates to improvements in boiler cleaners, the object of the invention being to provide a tool which is adapted to cut washers from the inner face of boiler structures, and which may be projected through an opening of less diameter than the length of the cutter bar by positioning the cutter bar at an angle to its support.

A further object is to provide an improved construction of cutter bar and cutters which may be reversed in the cutter bar so as to lengthen the life of the cutter without sharpening.

With these and other objects in view, the invention consists in certain novel features of construction and combinations and arrangements of parts, as will be more fully hereinafter described and pointed out in the claims.

In the accompanying drawings: Figure 1, is a view in side elevation illustrating in full lines the cutter bar in normal position, and in dotted lines in position to be inserted through a boiler opening. Fig. 2, is a view at right angles to Fig. 1, and Fig. 3, is a plan view of Fig. 1.

1, represents a fork or support having an angular integral shank 2 to be connected with any suitable mechanism for turning the same. The free ends of fork 1 are made with registering openings 3 for the accommodation of a bolt 4. This bolt 4 has a head 5 at one end, and is secured by a nut 6 at its other end, and between the members of the fork is positioned through a central opening 7 therein a cutter bar 8, so that while the cutter bar is secured to the fork, it is permitted a pivotal movement therein so as to position it at any desired angle with relation to the fork.

The cutter bar 8 is of general rectangular form in cross section, and at its ends is recessed as shown at 9 to expose the sides of the ends of the cutters 10. These cutters 10 are secured in longitudinal grooves 11 in the inner face of the cutter bar by means of set screws 12, which are screwed through threaded openings 13 in the bar, and jammed against the side faces of the cutters. Each cutter 10 comprises a bar of steel having its inner and outer faces beveled forming sharp cutting edges 14. By beveling both faces of the cutter, the latter may be reversed in the holder, so that two cutting edges are provided on each cutter, and when one becomes dull, the other may be brought into play by reversing the cutter.

By reference particularly to Fig. 3, it will be noted that the ends of the cutter bar and the inner walls of the recesses 9 are curved concentrically with the center of the bar, and as this bar is adapted to be turned with its center as an axis, and its cutters against a washer or uneven surface on the inside of a boiler, said cutters will move in a circle and cleanly cut the seat and the washer therefrom. When it is desired to insert the cutter, the bar is positioned at an angle as shown in dotted lines in Fig. 1, when it may be projected through an opening of a diameter less than the length of the cutter bar. When once through the opening, the cutter bar is positioned at right angles to fork 1, and then moved backwardly until its cutters 10 engage the washer. A turning movement imparted to the fork will cause the cutters to clean the washer or other foreign matter from the surface of the boiler.

Various slight changes might be made in the general form and arrangements of parts described without departing from my invention, and hence I do not limit myself to the precise details set forth, but consider myself at liberty to make such changes and alterations as fairly fall within the spirit and scope of the appended claims.

Having thus described my invention, what I claim as new and desire to secure by Letters Patent is:

1. A device of the character described, comprising a support adapted to be connected to means for transmitting a rotary motion thereto, a bar pivoted between its ends to said support, said bar having grooves in its inner face at its ends, and cutters secured in said grooves, substantially as described.

2. A device of the character described, comprising a support adapted to be connected to means for transmitting a rotary motion thereto, a bar pivoted between its ends to said support, said bar having grooves in its inner face at its ends, cutters secured in said grooves, said bar being recessed at its ends, and said cutters at their outer ends projecting into the recesses in the bar, substantially as described.

3. A device of the character described, comprising a fork, a bar, said bar and said fork having registering openings, the opening in the bar being in the center thereof, a bolt projecting through said openings, a nut on one end of said bolt, said bar having recesses in its inner face at its ends, and longitudinal grooves communicating with said recesses, cutters located in said grooves, and projecting into the recesses, and means in the bar for securing the cutters in the grooves, substantially as described.

4. A device of the character described, comprising a fork, a bar, said bar and said fork having registering openings, the opening in the bar being in the center thereof, a bolt projecting through said openings, a nut on one end of said bolt, said bar having recesses in its inner face at its ends, and longitudinal grooves communicating with said recesses, cutters located in said grooves, and projecting into the recesses, and means in the bar for securing the cutters in the grooves, said cutters having their outer and inner faces beveled, substantially as described.

In testimony whereof I have signed my name to this specification in the presence of two subscribing witnesses.

EDWARD S. CLINE.

Witnesses:
  STEPHEN G. WILSON,
  N. E. BYERS.

---

Copies of this patent may be obtained for five cents each, by addressing the "Commissioner of Patents, Washington, D. C."